E. B. OLDER & F. E. R. MEGOW.
Churn.
No. 213,444. Patented Mar. 18, 1879.
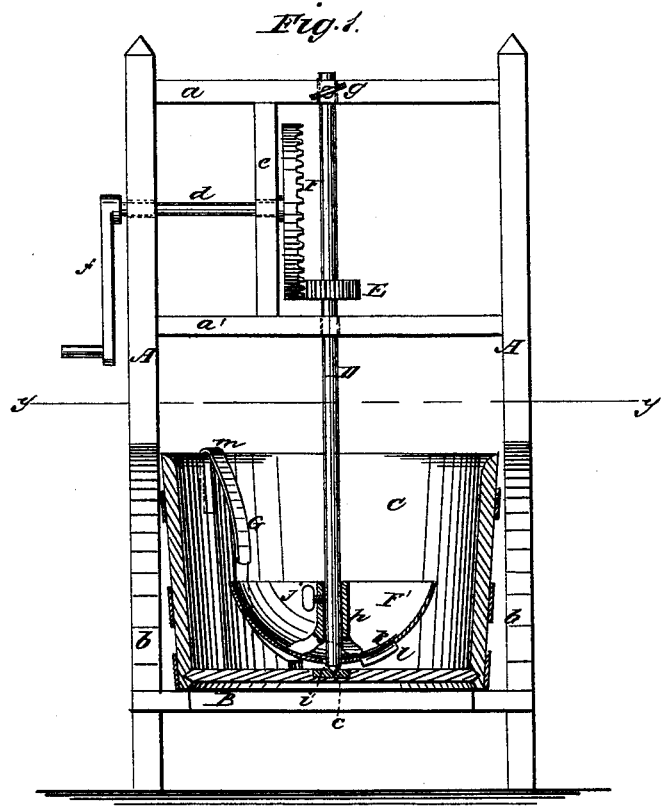
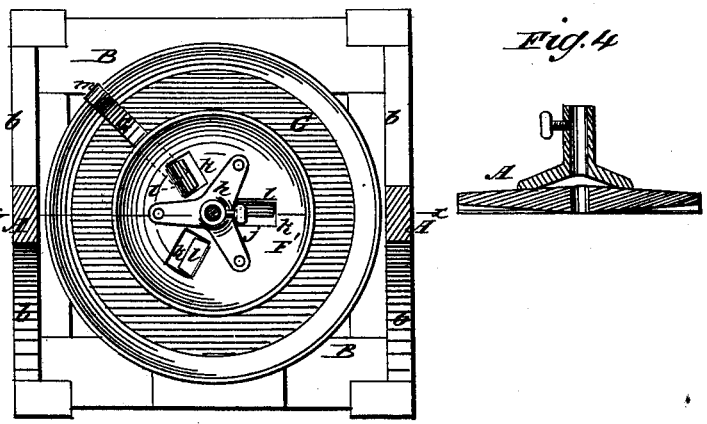
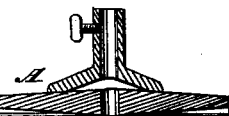
WITNESSES:
Francis McArdle
C. Sedgwick
INVENTOR:
E. B. Older
F. E. R. Megow
BY Munn & Co
ATTORNEYS.

UNITED STATES PATENT OFFICE.

EDSON B. OLDER AND FRANK E. R. MEGOW, OF INDEPENDENCE, IOWA.

IMPROVEMENT IN CHURNS.

Specification forming part of Letters Patent No. 213,444, dated March 18, 1879; application filed December 28, 1878.

*To all whom it may concern:*

Be it known that we, EDSON B. OLDER and FRANK E. R. MEGOW, of Independence, in the county of Buchanan and State of Iowa, have invented a new and useful Improvement in Churns, of which the following is a specification:

This invention relates to a churn that agitates the cream by centrifugal force, the object whereof is to thoroughly agitate and aerate the cream, and thus facilitate and quicken the operation of making butter.

The invention consists in a peculiarly shaped and operating pan or dasher, and in a corrugated gatherer, that is fixed to and rotated by the dasher-shaft.

In the accompanying drawings, Figure 1 is a vertical section of our improved churn on line $x\ x$ of Fig. 2. Fig. 2 is a section on line $y\ y$ of Fig. 1. Fig. 3 shows the corrugated disk used to facilitate the gathering of the butter, and Fig. 4 is a cross-section of the same.

Similar letters of reference indicate corresponding parts.

Referring to the drawings, A A are two uprights, placed opposite each other, and connected together above by cross-bars $a\ a'$. These uprights are supported in an upright position by braces $b\ b$. A platform, B, is built in the lower part of the frame-work, at a convenient distance from the floor to draw the buttermilk from the tub C, forming the receptacle for the cream.

An upright shaft, D, is passed through boxes in the cross-bars $a\ a'$, so as to fall at about the center of the platform, and thus rest on a plate, $c$, on the bottom of tub C, with its point in a socket therein when the machine is in operation, as clearly shown in Fig. 1.

On shaft D, just above cross-bar $a'$, is fixed a pinion, E, meshing with large gear-wheel F, fixed to a horizontal shaft, $d$, supported in uprights A and $e$.

By means of a crank, $f$, motion is given to shaft $d$, and thence through the gearing the upright shaft D is rotated. A set-screw, $g$, in cross-bar $a$ controls shaft D, so that it can be lifted and secured in any desired position.

F' represents the dasher, which consists of a hemispherical pan, whose edges are intended to rise above the cream, and which is arranged on a rotary shaft, so that the cream may be drawn through openings in the bottom, and forced out in an upward direction and outward by centrifugal force against the sides of tub C.

Inside, over the center of the pan, is fixed a spider-sleeve, $h$, the legs being soldered or otherwise secured to the pan. In the bottom of the pan is a hole, $i$, coincident with the sleeve. The shaft D is passed through the sleeve and through the pan, and the latter is connected with the shaft by a set-screw, $j$, passed through the sleeve, whereby the pan may be placed in different positions on the shaft, to accommodate its position to the quantity of cream in the tub.

In the bottom of the pan are three or more rectangular openings, $k\ k\ k$, radiating from the center. They are made by cutting out three sides and then bending the piece, thus forming lips $l\ l\ l$, projecting down from the bottom of the pan at an angle of about forty-five degrees. When the pan is rotated these lips take up the cream and throw it up through the openings into the pan.

G represents the brake, for preventing the rotation of the cream outside the pan. It consists of a piece of wood extending from the top to the bottom of the tub, and projecting toward and under the pan nearly to the center of the tub, without, however, interfering with the rotation of the pan. It is held in place by a spring-hook, $m$, placed over the edge of the tub.

H represents the device for assisting in the gathering of the butter. It is a wooden disk, with a hole in the center and a sleeve fixed to its upper side over the hole. The shaft D is passed through the sleeve and hole, and secured by a set-screw in the sleeve. The under side of the disk is corrugated, as is clearly shown in Figs. 3 and 4. When the butter has come, the pan is removed from the shaft and this disk fixed in its place, so as to rest just on top of the cream, and rotated. It being nearly of the same diameter as the tub, the corrugations act upon the particles of butter, driving them together, and thus condenses them, thereby assisting in the gathering and separation of the butter from the milk.

The operation of the invention is as follows:

The tub C is set upon the platform B, and the cream placed in it. The shaft is then let down until its pivoted point rests in the socket in plate c. The pan is then adjusted on the shaft in such a position that it will be partially, but not entirely, submerged; the edges must project above the surface of the cream. The shaft is then rotated rapidly. The lips $l$ force the cream up through the openings $k$ into the pan, from whence the centrifugal force throws it over the rim or edges, in a continuous sheet, against the sides of the tub C, thus thoroughly agitating and aerating it. It will be found that this action conduces to a rapid separation of the butter from the milky fluid.

The brake G prevents the rotary motion of the pan from being communicated to the cream outside, and thus beyond the circulation through the pan and outward to the sides, it remains in a condition to be readily and rapidly taken up into the pan.

When the butter comes the shaft is lifted, the pan removed, and the corrugated gatherer H placed on the shaft and lowered until it rests on the surface of the cream. It is then rotated, and the corrugations or ribs gather the buttery particles by forcing them together and condensing them, thus greatly facilitating the gathering of the butter.

The relative arrangement of the frame and pan and receptacle shown and described need not be adhered to in all cases.

The shafting may be journaled under a table, and the tub placed on the top thereof, with the shaft projecting upward through the bottom and into a socket in the pan, and otherwise arranged, as above described.

Having thus described our invention, we claim as new and desire to secure by Letters Patent—

1. A churn-dasher, consisting of a hemispherical pan, F′, secured adjustably to a rotary shaft, to allow the upper edge to be always above the cream, and provided with the bottom openings, $k$, and lips $l$, as and for the purpose specified.

2. The corrugated gatherer H, to be fixed to and rotated by shaft D, for assisting in the separation or gathering of the butter from the buttermilk, substantially as described.

EDSON BROWN OLDER.
FRANK EMIEL RUDOLPH MEGOW.

Witnesses:
WILLIAM L. MEGOW,
PERRY MUNSON.